(12) United States Patent
Ricart et al.

(10) Patent No.: US 11,117,538 B2
(45) Date of Patent: Sep. 14, 2021

(54) ELECTRICAL ASSEMBLY

(71) Applicant: Lear Corporation, Southfield, MI (US)

(72) Inventors: Raul Ricart, Tarragona (ES); Antoni Ferré Fàbregas, Tarragona (ES); Esteban Herrera, Tarragona (ES)

(73) Assignee: Lear Corporation, Southfield, MI (US)

( * ) Notice: Subject to any disclaimer, the term of this patent is extended or adjusted under 35 U.S.C. 154(b) by 34 days.

(21) Appl. No.: 16/222,071

(22) Filed: Dec. 17, 2018

(65) Prior Publication Data

US 2020/0189511 A1 Jun. 18, 2020

(51) Int. Cl.
  *B60R 21/01* (2006.01)
  *B60R 16/027* (2006.01)
  *B60R 21/207* (2006.01)
  *B60N 2/02* (2006.01)
  *B60N 2/015* (2006.01)

(52) U.S. Cl.
  CPC ............ *B60R 21/207* (2013.01); *B60N 2/015* (2013.01); *B60R 16/027* (2013.01); *B60N 2002/0264* (2013.01); *B60R 2021/01034* (2013.01); *B60R 2021/01286* (2013.01)

(58) Field of Classification Search
  CPC ............ B60N 2/105; B60N 2002/0272; B60N 2002/0264; B60N 2/015; B60R 21/01554; B60R 21/01034; B60R 2021/01109; B60R 16/027
  USPC .............................. 280/735; 307/10.1; 701/45
  See application file for complete search history.

(56) References Cited

U.S. PATENT DOCUMENTS

| | | | |
|---|---|---|---|
| 2,126,143 A | 8/1938 | McGregor |
| 2,263,554 A | 11/1941 | Brach |
| 2,480,622 A | 8/1949 | Warnock |
| 2,678,082 A | 5/1954 | Nathan |
| 3,181,102 A | 4/1965 | Fehr |

(Continued)

FOREIGN PATENT DOCUMENTS

| | | |
|---|---|---|
| CN | 203190203 U | 9/2013 |
| CN | 203799201 U | 8/2014 |

(Continued)

OTHER PUBLICATIONS

Co-pending U.S. Appl. No. 16/597,187, filed Oct. 9, 2019.
Co-pending U.S. Appl. No. 16/672,989, filed Nov. 4, 2019.
Co-pending U.S. Appl. No. 16/711,661, filed Dec. 12, 2019.

*Primary Examiner* — Ruth Ilan
(74) *Attorney, Agent, or Firm* — Fishman Stewart PLLC

(57) ABSTRACT

An electrical assembly includes a support assembly and a track assembly. The support assembly may include a controller, a first safety device, and/or a second safety device. The track assembly may include a first tack and/or a second track. The support assembly may be configured for selective mechanical and/or electrical connection with the track assembly in a first direction and/or in a second direction. The controller may be configured to receive a first signal and/or a second signal from the track assembly. The controller may provide the first signal to the first safety device and/or provide the second signal to the second safety device when the support assembly is connected with the track assembly in the first direction and when the support assembly is connected with the track assembly in the second direction. The first safety device may include an airbag that may be activated by pyrotechnics.

19 Claims, 4 Drawing Sheets

(56) References Cited

U.S. PATENT DOCUMENTS

| | | |
|---|---|---|
| 3,213,403 A | 10/1965 | Hermann |
| 3,268,848 A | 8/1966 | Adams |
| 3,603,918 A | 9/1971 | Woertz |
| 3,933,403 A | 1/1976 | Rubesamen et al. |
| 3,940,182 A | 2/1976 | Tamura |
| 4,020,769 A | 5/1977 | Keir |
| 4,198,025 A | 4/1980 | Lowe et al. |
| 4,243,248 A | 1/1981 | Scholz et al. |
| 4,282,631 A | 8/1981 | Uehara et al. |
| 4,511,187 A | 4/1985 | Rees |
| 4,575,295 A | 3/1986 | Rebentisch |
| 4,618,808 A | 10/1986 | Ish-Shalom et al. |
| 4,707,030 A | 11/1987 | Harding |
| 4,711,589 A | 12/1987 | Goodbred |
| 4,763,360 A | 8/1988 | Daniels et al. |
| 4,776,809 A | 10/1988 | Hall |
| 4,830,531 A | 5/1989 | Condit et al. |
| 4,853,555 A | 8/1989 | Wheat |
| 4,961,559 A | 10/1990 | Raymor |
| 4,969,621 A | 11/1990 | Munchow et al. |
| 4,987,316 A | 1/1991 | White et al. |
| 5,137,331 A | 8/1992 | Colozza |
| 5,167,393 A | 12/1992 | Hayakawa et al. |
| 5,192,045 A | 3/1993 | Yamada et al. |
| 5,222,814 A | 6/1993 | Boelryk |
| 5,322,982 A | 6/1994 | Leger et al. |
| 5,332,290 A | 7/1994 | Borlinghaus et al. |
| 5,348,373 A | 9/1994 | Stiennon |
| 5,362,241 A | 11/1994 | Matsuoka et al. |
| 5,446,442 A | 8/1995 | Swart et al. |
| 5,466,892 A | 11/1995 | Howard et al. |
| 5,489,173 A | 2/1996 | Hofle |
| 5,582,381 A | 12/1996 | Graf et al. |
| 5,599,086 A | 2/1997 | Dutta |
| 5,618,192 A | 4/1997 | Drury |
| 5,655,816 A | 8/1997 | Magnuson et al. |
| 5,676,341 A | 10/1997 | Tarusawa et al. |
| 5,696,409 A | 12/1997 | Handman et al. |
| 5,701,037 A | 12/1997 | Weber et al. |
| 5,796,177 A | 8/1998 | Werbelow et al. |
| 5,800,015 A | 9/1998 | Tsuchiya et al. |
| 5,899,532 A | 5/1999 | Paisley et al. |
| 5,918,847 A | 7/1999 | Couasnon |
| 5,921,606 A | 7/1999 | Moradell et al. |
| 5,964,442 A | 10/1999 | Wingblad et al. |
| 5,964,815 A | 10/1999 | Wallace et al. |
| 6,008,547 A * | 12/1999 | Dobler .................. B60R 16/027 307/10.1 |
| 6,036,157 A | 3/2000 | Baroin et al. |
| 6,081,044 A * | 6/2000 | Anthofer ................ B60R 21/01 307/10.1 |
| 6,142,718 A | 11/2000 | Kroll |
| 6,150,774 A | 11/2000 | Mueller et al. |
| 6,166,451 A | 12/2000 | Pigott |
| 6,216,995 B1 | 4/2001 | Koester |
| 6,227,595 B1 | 5/2001 | Hamelin et al. |
| 6,290,516 B1 | 9/2001 | Gerber |
| 6,296,498 B1 | 10/2001 | Ross |
| 6,299,230 B1 | 10/2001 | Oettl |
| 6,318,802 B1 | 11/2001 | Sjostrom et al. |
| 6,325,645 B1 | 12/2001 | Schuite |
| 6,357,814 B1 | 3/2002 | Boisset et al. |
| 6,400,259 B1 | 6/2002 | Bourcart et al. |
| 6,405,988 B1 | 6/2002 | Taylor et al. |
| 6,422,596 B1 | 7/2002 | Fendt et al. |
| 6,439,531 B1 | 8/2002 | Severini et al. |
| 6,480,144 B1 | 11/2002 | Miller et al. |
| 6,565,119 B2 * | 5/2003 | Fogle, Jr. .............. B60R 21/017 280/735 |
| 6,566,765 B1 * | 5/2003 | Nitschke ................ B60R 21/01 307/10.1 |
| 6,693,368 B2 | 2/2004 | Schumann et al. |
| 6,710,470 B2 | 3/2004 | Bauer et al. |
| 6,719,350 B2 | 4/2004 | Duchateau et al. |
| 6,736,458 B2 | 5/2004 | Chabanne et al. |
| 6,772,056 B2 | 8/2004 | Mattes et al. |
| 6,805,375 B2 | 10/2004 | Enders et al. |
| 6,851,708 B2 | 2/2005 | Kazmierczak |
| 6,882,162 B2 | 4/2005 | Schirmer et al. |
| 6,960,993 B2 | 11/2005 | Mattes et al. |
| 7,042,342 B2 | 5/2006 | Luo et al. |
| 7,083,437 B2 | 8/2006 | Mackness |
| 7,086,874 B2 | 8/2006 | Mitchell et al. |
| 7,113,541 B1 | 9/2006 | Lys et al. |
| 7,159,899 B2 | 1/2007 | Nitschke et al. |
| 7,170,192 B2 * | 1/2007 | Kazmierczak ....... B60N 2/0155 307/10.1 |
| 7,188,805 B2 | 3/2007 | Henley et al. |
| 7,207,541 B2 | 4/2007 | Frohnhaus et al. |
| 7,271,501 B2 | 9/2007 | Dukart et al. |
| 7,288,009 B2 | 10/2007 | Lawrence et al. |
| 7,293,831 B2 | 11/2007 | Greene |
| 7,300,091 B2 | 11/2007 | Nihonmatsu et al. |
| 7,322,605 B2 | 1/2008 | Ventura et al. |
| 7,348,687 B2 | 3/2008 | Aichriedler et al. |
| 7,363,194 B2 | 4/2008 | Schlick et al. |
| 7,370,831 B2 | 5/2008 | Laib et al. |
| 7,388,466 B2 | 6/2008 | Ghabra et al. |
| 7,389,960 B2 | 6/2008 | Mitchell et al. |
| 7,416,042 B2 | 8/2008 | Czaykowska et al. |
| 7,434,883 B2 | 10/2008 | Deptolla |
| 7,454,170 B2 | 11/2008 | Goossens et al. |
| 7,455,535 B2 | 11/2008 | Insalaco et al. |
| 7,503,522 B2 | 3/2009 | Henley et al. |
| 7,505,754 B2 | 3/2009 | Kazmierczak et al. |
| 7,523,913 B2 | 4/2009 | Mizuno et al. |
| 7,556,233 B2 | 7/2009 | Gryp et al. |
| 7,560,827 B2 | 7/2009 | Jacas-Miret et al. |
| 7,633,301 B2 | 12/2009 | Steenwyk et al. |
| 7,661,637 B2 | 2/2010 | Mejuhas et al. |
| 7,665,939 B1 | 2/2010 | Cardona |
| 7,739,820 B2 | 6/2010 | Frank |
| 7,744,386 B1 | 6/2010 | Speidel et al. |
| 7,980,525 B2 | 7/2011 | Kostin |
| 7,980,798 B1 | 7/2011 | Kuehn et al. |
| 8,010,255 B2 | 8/2011 | Darraba |
| 8,146,991 B2 | 4/2012 | Stanz et al. |
| 8,278,840 B2 | 10/2012 | Logiudice et al. |
| 8,282,326 B2 | 10/2012 | Krostue et al. |
| 8,376,675 B2 | 2/2013 | Schulze et al. |
| 8,463,501 B2 | 6/2013 | Jousse |
| 8,536,928 B1 | 9/2013 | Gagne et al. |
| 8,648,613 B2 | 2/2014 | Ewerhart et al. |
| 8,702,170 B2 | 4/2014 | Abraham et al. |
| 8,757,720 B2 | 6/2014 | Hurst, III et al. |
| 8,800,949 B2 | 8/2014 | Schebaum et al. |
| 8,857,778 B2 | 10/2014 | Nonomiya |
| 8,936,526 B2 | 1/2015 | Boutouil et al. |
| 8,967,719 B2 | 3/2015 | Ngiau et al. |
| RE45,456 E | 4/2015 | Sinclair et al. |
| 9,010,712 B2 | 4/2015 | Gray et al. |
| 9,018,869 B2 | 4/2015 | Yuasa et al. |
| 9,045,061 B2 | 6/2015 | Kostin et al. |
| 9,162,590 B2 | 10/2015 | Nagura et al. |
| 9,174,604 B2 | 11/2015 | Wellhoefer et al. |
| 9,242,580 B2 | 1/2016 | Schebaum et al. |
| 9,318,922 B2 | 4/2016 | Hall et al. |
| 9,340,125 B2 | 5/2016 | Stutika et al. |
| 9,346,428 B2 | 5/2016 | Bortolin |
| 9,422,058 B2 | 8/2016 | Fischer et al. |
| 9,561,770 B2 | 2/2017 | Sievers et al. |
| 9,608,392 B1 | 3/2017 | Destro |
| 9,610,862 B2 | 4/2017 | Bonk et al. |
| 9,663,232 B1 | 5/2017 | Porter et al. |
| 9,673,583 B2 | 6/2017 | Hudson et al. |
| 9,701,217 B2 | 7/2017 | Eckenroth et al. |
| 9,731,628 B2 | 8/2017 | Rao et al. |
| 9,758,061 B2 | 9/2017 | Pluta et al. |
| 9,789,834 B2 | 10/2017 | Rapp et al. |
| 9,796,304 B2 | 10/2017 | Salter et al. |
| 9,815,425 B2 | 11/2017 | Rao et al. |
| 9,821,681 B2 | 11/2017 | Rao et al. |
| 9,840,220 B2 | 12/2017 | Van Buskirk et al. |
| 9,919,624 B2 | 3/2018 | Cziomer et al. |

(56) References Cited

U.S. PATENT DOCUMENTS

| | | |
|---|---|---|
| 9,950,682 B1 | 4/2018 | Gramenos et al. |
| 10,059,232 B2 | 8/2018 | Frye et al. |
| 10,160,351 B2 | 12/2018 | Sugimoto et al. |
| 10,479,227 B2 | 11/2019 | Nolte et al. |
| 10,493,243 B1 | 12/2019 | Braham |
| 10,547,135 B2 | 1/2020 | Sugiura |
| 10,549,659 B2 | 2/2020 | Sullivan et al. |
| 10,654,378 B2 | 5/2020 | Pons |
| 2005/0046367 A1 | 3/2005 | Wevers et al. |
| 2005/0089367 A1 | 4/2005 | Sempliner |
| 2005/0150705 A1 | 7/2005 | Vincent et al. |
| 2005/0211835 A1 | 9/2005 | Henley et al. |
| 2005/0215098 A1 | 9/2005 | Muramatsu et al. |
| 2005/0230543 A1 | 10/2005 | Laib et al. |
| 2005/0236899 A1* | 10/2005 | Kazmierczak ........ B60R 16/027 307/10.1 |
| 2005/0258676 A1 | 11/2005 | Mitchell et al. |
| 2006/0131470 A1 | 6/2006 | Yamada et al. |
| 2006/0208549 A1 | 9/2006 | Hancock et al. |
| 2006/0220411 A1 | 10/2006 | Pathak et al. |
| 2008/0021602 A1 | 1/2008 | Kingham et al. |
| 2008/0084085 A1 | 4/2008 | Mizuno et al. |
| 2008/0090432 A1 | 4/2008 | Patterson et al. |
| 2009/0014584 A1 | 1/2009 | Rudduck et al. |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0117275 A1 | 5/2010 | Nakamura |
| 2011/0024595 A1 | 2/2011 | Oi et al. |
| 2012/0112032 A1 | 5/2012 | Kohen |
| 2013/0020459 A1 | 1/2013 | Moriyama et al. |
| 2013/0035994 A1 | 2/2013 | Pattan et al. |
| 2014/0263920 A1 | 9/2014 | Anticuar et al. |
| 2014/0265479 A1 | 9/2014 | Bennett |
| 2015/0048206 A1 | 2/2015 | Deloubes |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2016/0039314 A1 | 2/2016 | Anticuar et al. |
| 2016/0154170 A1 | 6/2016 | Thompson et al. |
| 2016/0236613 A1 | 8/2016 | Trier |
| 2017/0080825 A1 | 3/2017 | Bonk et al. |
| 2017/0080826 A1 | 3/2017 | Bonk et al. |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2018/0017189 A1 | 1/2018 | Wegner |
| 2018/0039917 A1 | 2/2018 | Buttolo et al. |
| 2018/0086232 A1 | 3/2018 | Kume |
| 2018/0105072 A1 | 4/2018 | Pons |
| 2018/0126682 A1 | 5/2018 | Fiessler et al. |
| 2018/0148011 A1 | 5/2018 | Zaugg et al. |
| 2018/0183623 A1 | 6/2018 | Schoenfeld et al. |
| 2018/0275648 A1 | 9/2018 | Ramalingam |
| 2019/0001846 A1 | 1/2019 | Jackson et al. |
| 2019/0084453 A1 | 3/2019 | Petit et al. |
| 2019/0126786 A1 | 5/2019 | Dry et al. |
| 2019/0337413 A1 | 11/2019 | Romer |
| 2019/0337414 A1 | 11/2019 | Condamin et al. |
| 2019/0337415 A1 | 11/2019 | Condamin et al. |
| 2019/0337416 A1 | 11/2019 | Condamin et al. |
| 2019/0337417 A1 | 11/2019 | Condamin et al. |
| 2019/0337418 A1 | 11/2019 | Condamin et al. |
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389336 A1 | 12/2019 | Malinowski et al. |
| 2020/0009995 A1 | 1/2020 | Sonar |
| 2020/0055423 A1 | 2/2020 | Prozzi et al. |
| 2020/0079244 A1 | 3/2020 | Carbone et al. |
| 2020/0180516 A1 | 6/2020 | Moulin |
| 2020/0180517 A1 | 6/2020 | Moulin |
| 2020/0189504 A1 | 6/2020 | Ricart et al. |
| 2020/0194936 A1 | 6/2020 | Ricart et al. |
| 2020/0194948 A1 | 6/2020 | Lammers et al. |
| 2020/0207241 A1 | 7/2020 | Moulin et al. |
| 2020/0262367 A1 | 8/2020 | Fernandez Banares et al. |
| 2020/0269754 A1 | 8/2020 | Ricart et al. |
| 2020/0282871 A1 | 9/2020 | Ricart et al. |
| 2020/0282880 A1 | 9/2020 | Jones et al. |
| 2020/0398776 A1 | 12/2020 | Tippy et al. |

FOREIGN PATENT DOCUMENTS

| | | |
|---|---|---|
| DE | 3710476 A1 | 10/1987 |
| DE | 29712180 U1 | 9/1997 |
| DE | 101 03 280 A1 | 8/2002 |
| DE | 101 64 068 A1 | 4/2003 |
| DE | 102 58 837 B3 | 4/2004 |
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016113409 A1 | 4/2017 |
| EP | 0565973 A1 | 10/1993 |
| EP | 0783990 A1 | 7/1997 |
| EP | 1176047 A1 | 1/2002 |
| EP | 1209024 A1 | 5/2002 |
| EP | 1431104 A2 | 6/2004 |
| EP | 2298609 B1 | 3/2011 |
| EP | 1699661 B1 | 8/2012 |
| EP | 3150426 A1 | 4/2017 |
| FR | 2762814 A1 | 11/1998 |
| FR | 2864481 B1 | 4/2006 |
| FR | 2951329 A1 | 4/2011 |
| FR | 2986751 A1 | 8/2013 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2013230721 A | 11/2013 |
| WO | 01/87665 A1 | 11/2001 |
| WO | 2003002256 A2 | 1/2003 |
| WO | 2004098943 A1 | 11/2004 |
| WO | 2005068247 A2 | 7/2005 |

* cited by examiner

ELECTRICAL ASSEMBLY

TECHNICAL FIELD

The present disclosure generally relates to electrical assemblies, including electrical assemblies that may be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some electrical assemblies may be relatively complex and/or may not provide sufficient functionality. Some electrical assemblies may not be configured for use with vehicle seats or removable or reconfigurable seats, such as vehicle seats that include airbags.

There is a desire for solutions/options that minimize or eliminate one or more challenges or shortcomings of electrical assemblies. The foregoing discussion is intended only to illustrate examples of the present field and should not be taken as a disavowal of scope.

SUMMARY

In embodiments, an electrical assembly may include a support assembly and a track assembly. The support assembly may include a controller, a first safety device, and/or a second safety device. The track assembly may include a first track and/or a second track. The support assembly may be configured for selective mechanical and/or electrical connection with the track assembly in a first direction and/or in a second direction. The controller may be configured to receive a first signal and/or a second signal from the track assembly. The controller may provide the first signal to the first safety device and/or provide the second signal to the second safety device when the support assembly is connected with the track assembly in the first direction and when the support assembly is connected with the track assembly in the second direction. The first safety device may include an airbag that may be activated by pyrotechnics. The pyrotechnics of the first safety device may be configured to be activated by the first signal. The first track may include a first conductor and/or a second conductor. The second track may include a first conductor and/or a second conductor. The support assembly may include a first portion that may include a first contact and/or a second contact. The first contact may be configured to contact the first conductor of the first track when the support assembly is connected to the track assembly in the first direction. The first contact may be configured to contact the first conductor of the second track when the support assembly may be connected to the track assembly in the second direction.

With embodiments, the support assembly may include a second portion that may include a first contact and/or a second contact. The first contact of the second portion may be configured to contact the first conductor of the second track when the support assembly is connected to the track assembly in the first direction. The first contact of the second portion may be configured to contact the first conductor of the first track when the support assembly is connected to the track assembly in the second direction. The second contact of the first portion may be configured to contact the second conductor of the first track when the support assembly is connected to the track assembly in the first direction. The second conductor may be connected to a power supply. The second contact of the second portion may be configured to contact the second conductor of the second track when the support assembly is connected to the track assembly in the first direction.

In embodiments, the controller may include a router that may be configured to provide the first signal to the first safety device and/or provide the second signal to the second safety device regardless of whether the support assembly is connected to the track assembly in the first direction and/or the second direction. The electrical assembly may include a first sensor that may be configured to obtain information about a status of the first safety device. The electrical assembly may include a second controller that may have a first sensor mirror. The controller may be configured to provide the information about a state of the first safety device to the first sensor mirror via a wireless communication device. The electrical assembly may include a third controller that may be connected to the second controller. The third controller may be configured to generate the first signal and/or the second signal. The third controller may include a secondary power supply. The third controller may be configured to provide the first signal and/or the second signal to the second controller even if a primary power supply is disconnected, off, or not functioning.

With embodiments, the electrical assembly may include a support member, a track assembly, a second controller, and/or a third controller. The support member may include a first controller, a first safety device, and/or a second safety device. The track assembly may include a first track and/or a second track. The second controller may be connected to the first track and/or the second track. The third controller may be connected to the second controller and/or may be configured to generate a first signal and/or a second signal. The support member may be configured for connection with the first track and the second track. The second controller may provide the first signal and/or the second signal from the third controller to the first controller via the first track and/or the second track. The electrical assembly may include one or more crash sensors that may be connected to the third controller. The third controller may be configured to generate the first signal and/or the second signal according to information from the one or more crash sensors.

In embodiments, first controller may be electrically connected to the first safety device and/or configured to provide the first signal to the first safety device. The support assembly may include a first sensor and/or a second sensor. The second controller may include a first sensor mirror and/or a second sensor mirror. The first sensor may be configured to communicate with the first sensor mirror of the second controller. The second sensor of the first controller may be configured to communicate with the second sensor mirror of the second controller. The first sensor may be configured to obtain information about a status of the first safety device. The second sensor of the second controller may be configured to obtain information about a status of the second safety device. The third controller may be configured for connection with a first power supply, and/or the third controller may include a second power supply. The third controller may be configured to generate the first signal and/or the second signal via the second power supply when the first power supply is disconnected or off.

The foregoing and other aspects, features, details, utilities, and/or advantages of embodiments of the present disclosure will be apparent from reading the following description, and from reviewing the accompanying drawings.

DETAILED DESCRIPTION

Figure 1:
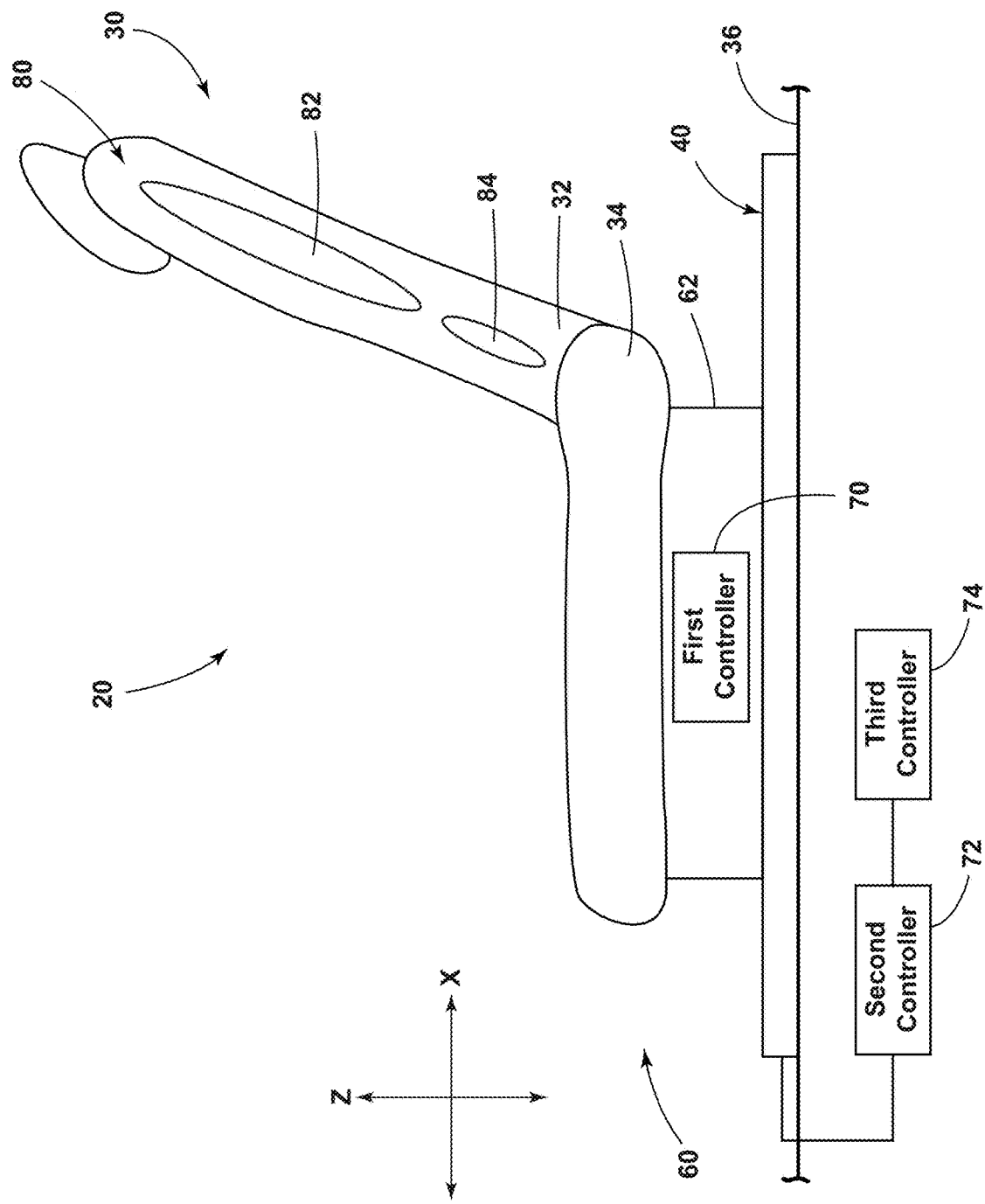
FIG. 1 is a side view generally illustrating an embodiment of an electrical assembly according to teachings of the present disclosure.

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

In embodiments, an electrical assembly 20 may include a track assembly 40 and/or a support assembly 60. The support assembly 60 may include a support member 62 and/or a seat 30. The support member 62 may be configured to support a seat 30 and may be configured to move (e.g., slide, roll, translate, etc.) with the seat 30 along the track assembly 40. The electrical assembly 20 may be configured to control (e.g., activate/deactivate) and/or monitor various safety devices 80 within a vehicle. The electrical assembly 20 may activate various safety devices 80, such as when sensing a crash event or imminent crash event, and/or the electrical assembly 20 may monitor the operating status of various safety devices 80 at substantially all times. The electrical assembly 20 may be disposed within and/or connected to a vehicle.

Figure 2:
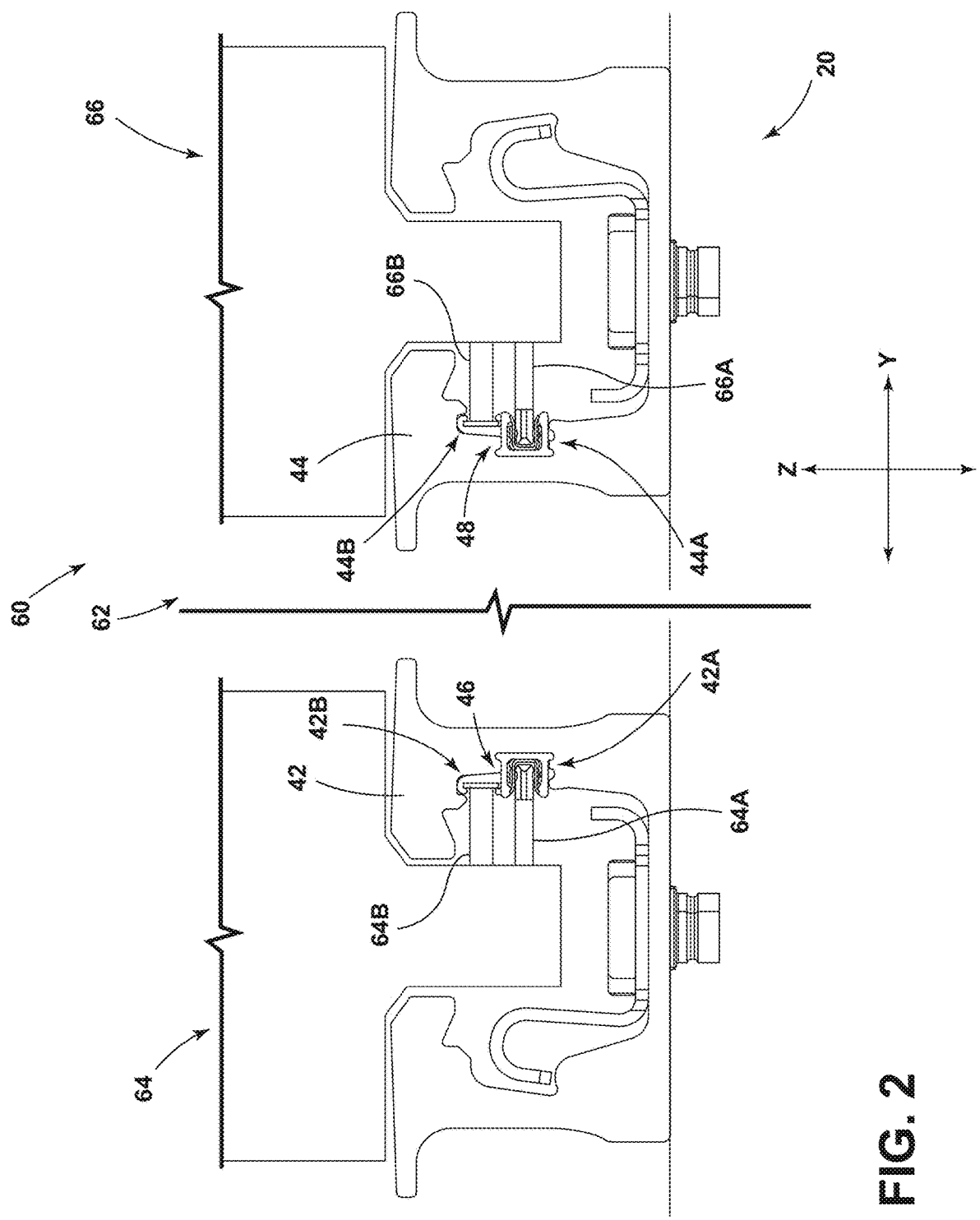
FIG. 2 is a cross-sectional view generally illustrating portions of an embodiment of an electrical assembly according to teachings of the present disclosure.

With embodiments, the electrical assembly 20 may include a track assembly 40. The track assembly 40 may include a first track 42 and/or a second track 44 (see, e.g., FIG. 2). The first track 42 and/or the second track 44 may be disposed on and/or connected to a mounting surface 36 (e.g., a vehicle floor). The first track 42 and/or the second track 44 may extend substantially in the X-direction. The first track 42 may be substantially parallel to the second track 44, and/or the first track 42 may be offset in the Y-direction from the second track 44. The first track 42 and/or the second track 44 may mechanically and/or electrically connect to a support assembly 60, such as to a support member 62 and/or a seat 30.

Figure 3:
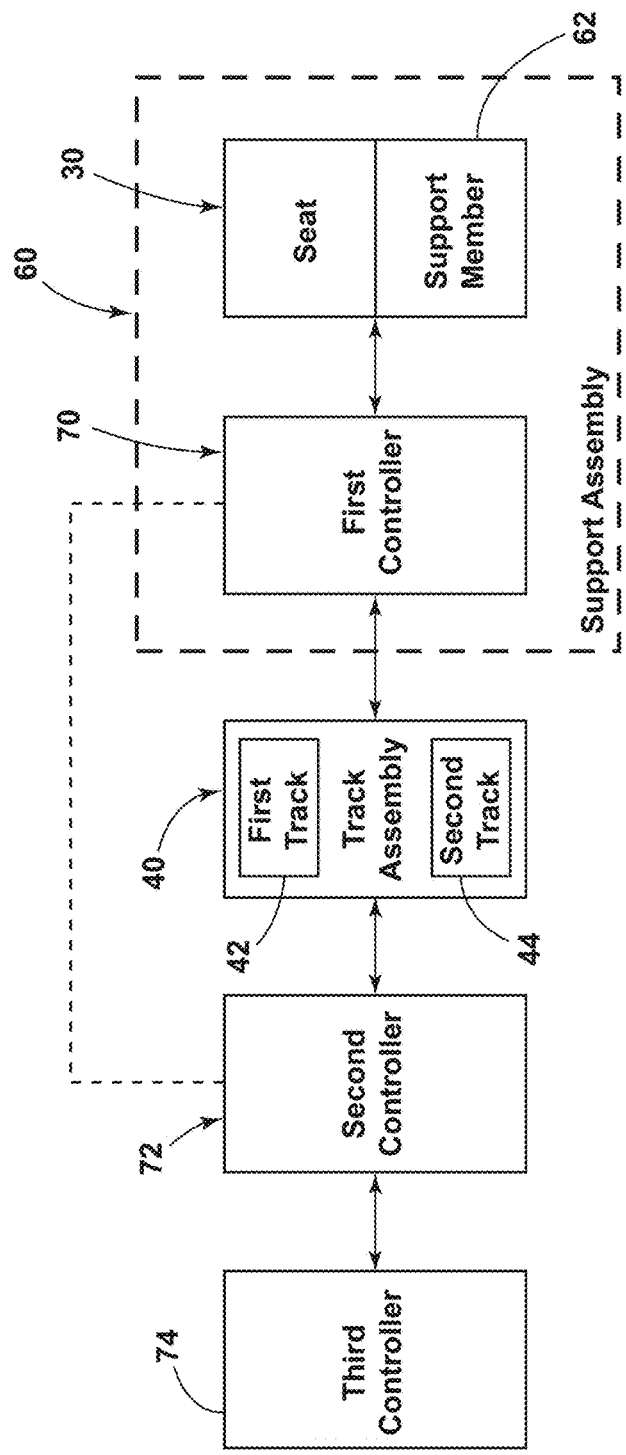
FIG. 3 is a schematic view generally illustrating an embodiment of an electrical assembly according to teachings of the present disclosure.

In embodiments, such as generally illustrated in FIG. 3, the first track 42 and/or the second track 44 may be electrically connected to a first controller 70 that may be connected to and/or incorporated with the support assembly 60. The first controller 70 may be connected to and/or disposed in the support member 62 and/or the seat 30. The first track 42 may include a first conductor 42A and/or a second conductor 42B. One or both of the conductors 42A, 42B may be electrically connected to the first controller 70. The second conductor 42B may be connected to a primary power supply 120 and may provide power to the first controller 70. The second track 44 may include a first conductor 44A and/or a second conductor 44B that may be electrically connected to the first controller 70. The conductors 42A, 42B, 44A, 44B may be disposed within a side of the tracks 42, 44. The tracks 42, 44 may include recesses/apertures 46, 48 configured to at least partially receive the conductors 42A, 42B, 44A, 44B. The conductors 42A, 42B, 44A, 44B may electrically connect to the support assembly 60 and/or various electrical components within the support assembly 60. The conductors 42A, 42B, 44A, 44B may be configured to provide power and/or to send signals/data via the first track 42 and/or the second track 44 to/from the support assembly 60 (e.g., the first controller 70).

In embodiments, the support member 62 may be configured to support the seat 30 and/or one or more items or components that may be disposed on or connected to the seat 30, such as an occupant. The seat 30 may include a seat back 32 and/or a seat base 34. The support member 62 may mechanically support the seat 30 on the track assembly 40. The support member 62 and/or the seat 30 may be configured to move along the track assembly 40 substantially in the X-direction. The seat 30 and/or the support member 62 may be configured to be selectively inserted into and/or selectively removed from the track assembly 40, such as in the Z-direction. The support assembly 60 may include, be connected to, and/or control/facilitate operation of one or more safety measures (e.g., for an occupant of the seat 30), such as via the first controller 70. The support member 62 may include a first portion 64 and/or a second portion 66 that may be disposed opposite each other and may be configured for connection with the first track 42 and/or the second track 44. For example and without limitation, the first portion 64 may be connected to the first track 42 and the second portion 66 may be connected to the second track 44. Additionally or alternatively, the first portion 64 may be connected to the second track 44 and the second portion 66 may be connected to the first track 42. The first portion 64 may include a first contact 64A and a second contact 64B (e.g., electrical contacts). The second portion 66 may include a first contact 66A and a second contact 66B.

With embodiments, the first contacts 64A, 66A may be configured for electrical connection with the first conductors 42A, 44A of the first track 42 and the second track 44. For example, if the support assembly 60 is connected with the track assembly 40 in a first direction (e.g., facing the front of a vehicle), the first contact 64A of the first portion 64 may electrically connect with the first conductor 42A of the first track 42, and the first contact 66A of the second portion 66 may electrically connect with the first conductor 44A of the second track 44. Additionally or alternatively, if the support assembly 60 is connected with the track assembly 40 in a second direction (e.g., facing a rear of a vehicle), the first contact 64A of the first portion 64 may electrically connect with the first conductor 44A of the second track 44, and the first contact 66A of the second portion 66 may electrically connect with the first conductor 42A of the first track 42. The second contacts 64B, 66B may be configured for electrical connection with the second conductors 42B, 44B of the first track 42 and the second track 44. For example, if the support assembly 60 is connected with the track assembly 40 in a first direction, the second contact 64B of the first portion 64 may electrically connect with the second conductor 42B of the first track 42, and the second contact 66B of the second portion 66 may electrically connect with the second conductor 44B of the second track 44. Additionally or alternatively, if the support assembly 60 is connected with the track assembly 40 in a second direction, the second contact 64B of the first portion 64 may electrically connect with the second conductor 44B of the second track 44, and the second contact 66B of the second portion 66 may electrically connect with the second conductor 42B of the first track 42.

With embodiments, the first contacts 64A, 66A and/or the second contacts 64B, 66B may be movably connected with the support member 62. For example and without limitation, the first contacts 64A, 66A and the second contacts 64B, 66B may move (e.g., rotate, translate, etc.) into engagement with the conductors 42A, 42B, 44A, 44B to provide electrical connections and may move out of engagement with the conductors 42A, 42B, 44A, 44B to facilitate insertion/removal of the support assembly 60 into/from the track assembly 40 (e.g., in a Z-direction).

With embodiments, the support assembly 60 may include one or more safety devices 80. The safety devices 80 may include one or more of a variety of crash activated safety measures. For example and without limitation, the safety devices 80 may include air bags and/or pretensioners. The safety devices 80 may include and/or be activated/triggered by pyrotechnics. For example and without limitation, the safety devices 80 may be configured to rapidly/instantly expand (e.g., an air bag may inflate with air) upon activation. The safety devices 80 may be configured to be activated by a signal (e.g., a deployment current pulse) transmitted via the track assembly 40. The one or more safety devices 80 may include a first safety device 82 and/or a second safety device 84. The first safety device 82 and/or the second safety device 84 may be disposed in the seat back 32 and/or the seat base 34. The first safety device 82 and/or the second safety device 84 may be disposed proximate the seat 30 such as to contact and/or limit movement of an occupant when activated.

Figure 4:
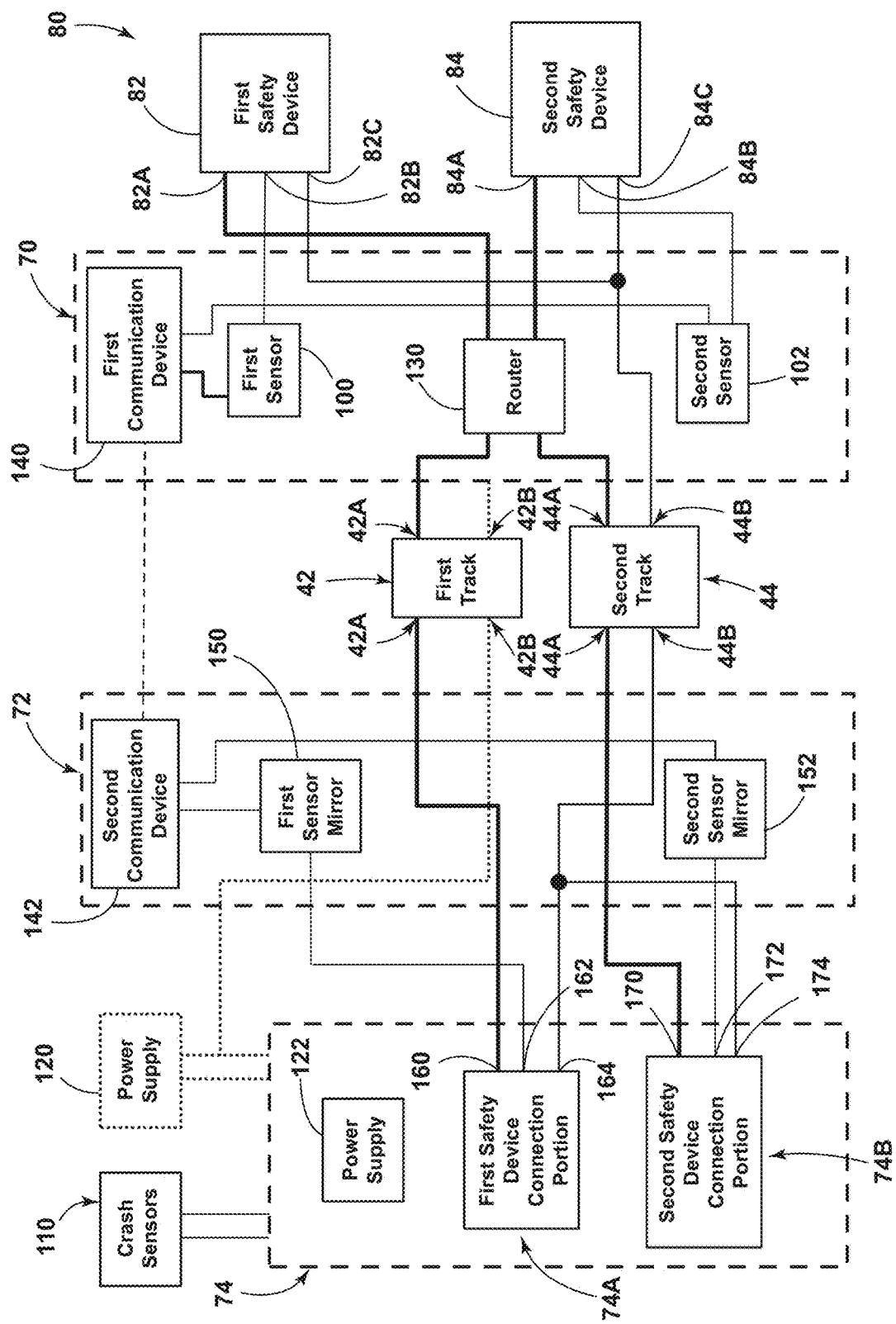
FIG. 4 is a schematic view generally illustrating an embodiment of an electrical assembly according to teachings of the present disclosure.

In embodiments, such as generally illustrated in FIG. 4, the first safety device 82 may include a first contact 82A, a second contact 82B, and/or a third contact 82C. The second safety device 84 may include a first contact 84A, a second contact 84B, and/or a third contact 84C. The first contacts 82A, 84A of the first safety device 82 and the second safety device 84 may be configured to receive a signal (e.g., a trigger signal and/or a digital signal) that may trigger/activate the safety device 82, 84 (e.g., ignite a pyrotechnic). The second contacts 82B, 84B of the first safety device 82 and/or the second safety device 84 may be connected to respective safety device sensors 100, 102. The safety device sensors 100, 102 may be configured for obtaining information about, reading, and/or determining the status of the first safety device 82 and/or the second safety device 84. The third contact 82C, 84C of the first safety device 82 and/or the second safety device 84 may be configured to communicate a low/return portion of a signal and/or may be connected to a ground (e.g., an electrical ground, such as a chassis/frame of a vehicle).

With embodiments, the support assembly 60 may include a first controller 70 that may be disposed within the support member 62 and/or within the seat 30. The first controller 70 may be configured to receive a first signal from the first conductor 42A, 44A of one of the first track 42 and the second track 44, and/or the first controller 70 may be configured to receive a second signal from the first conductor 42A, 44A of the other of the first track 42 and the second track 44. The first signal and/or the second signal may be trigger signals. The first controller 70 may be configured to provide the first signal to the first contact 82A of the first safety device 82 and/or provide the second signal to the first contact 84A of the second safety device 84. The first signal and/or the second signal may be configured to trigger (e.g., activate, ignite, etc.) the first safety device 82 and/or the second safety device 84, respectively. For example and without limitation, the safety devices 82, 84 may not be connected to a separate power supply and the first signal and the second signal may be sufficient on their own to deploy the safety devices 82, 84, respectively.

With embodiments, the electrical assembly 20 may include a second controller 72. The second controller 72 may be disposed in the vehicle, and/or the second controller 72 may not be disposed in the seat 30 and/or support member 62. The second controller 72 may be connected (e.g., electrically) to the first track 42, the second track 44, and/or the first controller 70. The second controller 72 may be configured to communicate with the first controller 70, such as via a wired/physical connection (e.g., via power line communication (PLC)) and/or via a wireless connection. For example and without limitation, the second controller 72 may be configured to generate the first signal and/or the second signal and may transmit the first signal and/or the second signal to the first controller 70 via the first conductor 42A, 44A and/or the second conductor 42B, 44B. Additionally or alternatively, the first controller 70 may wirelessly communicate (or via PLC) the status of the first safety device 82 and/or the second safety device 84 to the second controller 72. Communications with PLC may be conducted via the track assembly 40, such as without wires connecting the track assembly 40 to the support assembly 60.

In embodiments, the electrical assembly 20 may include a third controller 74. The third controller 74 may be disposed in the vehicle and/or may not be disposed in the seat 30 and/or the support member 62. The third controller 74 may be configured to determine if the safety devices 80 should be triggered (e.g., if a crash event has occurred or is imminent) and/or may be configured to generate (or cause the second controller 72 to generate) the first signal and/or the second signal. The third controller 74 may be connected to and/or may include one or more crash sensors 110. The crash sensors 110 may be configured to detect if a vehicle is about to experience a collision and/or is experiencing a collision. The third controller 74 may be connected to a first/primary power supply 120 (e.g., a vehicle battery). The electrical assembly 20 may include a second/secondary power supply 122 (e.g., a battery, supercapacitor, etc.) that may be connected to and/or incorporated with the third controller 74. The third controller 74 may include a first safety device connection portion 74A and/or a second safety device connection portion 74B. The third controller 74 may receive information from the one or more crash sensors 110 and may communicate the first signal and/or the second signal via the first safety device connection portion 74A and/or the second safety device connection portion 74B to activate the safety devices 80. Additionally or alternatively, the third controller 74 may be configured to provide instruction to the second controller 72 via the connection portions 74A, 74B to generate the first signal and/or the second signal to activate the safety devices 80. While the second controller 72 and the third controller 74 may be shown or described as separate components, the second controller 72 and the third controller 74 may be integrated, at least to some degree, with each other or one or more other than controllers.

With embodiments, the second conductor 42B of the first track 42 may be connected to a power supply (e.g., the primary power supply 120) and/or may connect the support assembly 60, including the first controller 70, to the primary power supply 120. The second conductor 44B of the second track 44 may be connected to a ground (e.g., an electrical ground) and/or may connect the support assembly 60, including the first controller 70, to ground.

In some instances, the primary power supply 120 may not be active and/or the second conductor 44B of the second track 44 may not be connected to a ground. For example and without limitation, in the event of a crash event, the primary power supply 120 may be shut off and/or disconnected from the electrical assembly 20. The electrical assembly 20 may be configured to trigger/activate the safety devices 80 even in such instances (e.g., the electrical assembly 20 may be configured to trigger the safety devices 80 even when the electrical assembly 20 is not receiving power from a primary power supply 120, such as from the vehicle battery).

With embodiments, the first controller 70 may be connected to the third contact 82C of the first safety device 82 and/or the third contact 84C of the second safety device 84. The first controller 70 may connect the third contact 82C of the first safety device 82 to the third contact 84C of the second safety device 84. The first controller 70 may connect the third contacts 82C, 84C to the second track 44 (e.g., the second conductor 44B of the second track 44).

In embodiments, the first controller 70 may include a router 130. The router 130 may be connected to the first track 42, the second track 44, the first safety device 82, and/or the second safety device 84. The router 130 may receive the first signal (e.g., a first trigger signal) from the one of the first track 42 and the second track 44, and/or may receive the second signal (e.g., a second trigger signal) from the other of the first track 42 and the second track 44. The router 130 may transmit (e.g., send) the first signal to the first safety device 82 and/or the second signal to the second safety device 84. The router 130 may be configured to determine which signal is being transmitted via the first contact 64A of the first portion 64 and which signal is being transmitted via the first contact 66A of the second portion 66. If the support assembly 60 is connected to the track assembly 40 in a first direction (e.g., facing the front of the vehicle), the first signal may be transmitted via the first contact 64A of the first portion 64 (which may be connected to the first conductor 42A of the first track 42) and the second signal may be transmitted via the first contact 66A of the second portion 66 (which may be connected to the first conductor 44A of the second track 44). If the support assembly 60 is connected to the track assembly 40 in a second direction (e.g., facing a rear of the vehicle), the first signal may be transmitted via the first contact 66A of the second portion 66 (which may be connected to the first conductor 42A of the first track 42) and the second signal may be transmitted via the first contact 64A of the first portion 64 (which may be connected to the first conductor 44A of the second track 44). The router 130 may provide the first signal to the first safety device 82 regardless of the contact 64A, 66A via which the first signal is transmitted. The router 130 may provide the second signal to the second safety device 84 regardless of the contact 64A, 66A via which the second signal is transmitted.

In embodiments, the router 130 may be configured to analyze the signals provided to the router 130 and determine which signal is the first signal and which signal is the second signal. For example and without limitation, the first signal and the second signal may include different properties (e.g., amplitude, duty cycle, frequency, timing, etc.) and the router 130 may be configured to identify the signals according to one or more different properties. Additionally or alternatively, one or more of the first controller 70, the second controller 72, and the third controller 74 (or another controller) may be configured to determine an orientation of the support assembly 60 and may provide information regarding the orientation of the support assembly 60 to the router 130.

If the router 130 receives information indicating that the support assembly 60 is connected to the track assembly 40 in the first direction, the router 130 may provide the signal from the first conductor 42A of the first track 42 (via the first contact 64A) to the first safety device 82 and/or may provide the signal from the first conductor 44A of the second track 44 (via the first contact 66A) to the second safety device 84. If the router 130 receives information indicating that the support assembly 60 is connected to the track assembly 40 in the second direction, the router 130 may provide the signal from the first conductor 42A of the first track 42 (via the first contact 66A) to the first safety device 82 and/or provide the signal from the first conductor 44A of the second track 44 (via the first contact 64A) to the second safety device 84.

With embodiments, the first controller 70 may include or be connected to one or more safety device sensors, such as a first sensor 100 and a second sensor 102. The first sensor 100 and/or the second sensor 102 may read (e.g., receive, monitor, etc.) a status of the first safety device 82 and/or a status of the second safety device 84, respectively. The first sensor 100 may be connected to the second contact 82B of the first safety device 82 and/or the second sensor 102 may be connected to the second contact 84B of the second safety device 84.

In embodiments, the first controller 70 may be configured to transmit information from the first sensor 100 and/or the second sensor 102, such as to the second controller 72. For example and without limitation, the first sensor 100 and/or the second sensor 102 may be connected to a first communication device (e.g., via PLC or wireless communication) 140 that may be configured to transmit a first sensor signal from the first sensor 100 and/or transmit a second sensor signal from the second sensor 102 to the second controller 72.

With embodiments, the second controller 72 may include a second communication device 142 (e.g., a device configured to communicate via PLC or wirelessly), a first sensor mirror 150, and/or a second sensor mirror 152. The first communication device 140 of the first controller 70 may transmit a first sensor signal from the first sensor 100 and/or a second sensor signal from the second sensor 102 to the second communication device 142 (e.g., via PLC or wirelessly). The first communication device 140 and/or the second communication device 142 may provide the first sensor signal to the first sensor mirror 150 and/or may provide the second sensor signal to the second sensor mirror 152 (e.g., via PLC or wirelessly). The first sensor mirror 150 and/or the second sensor mirror 152 may function to effectively duplicate the status of the first safety device 82 and/or the second safety device 84, respectively. The first sensor mirror 150 may be connected to the first safety device connection portion 74A of the third controller 74. The second sensor mirror 152 may be connected to the second safety device connection portion 74B of the third controller 74.

With embodiments, the first safety device connection portion 74A may include a first contact 160, a second contact 162, and/or a third contact 164 (e.g., high, sense, and low contacts). The first contact 160 may be connected to the first conductor 42A of the first track 42. The third controller 74 may generate and provide the first signal to the second controller 72 (or instruct the second controller 72 to generate the first signal), and the second controller 72 may provide the first signal to the first controller 70 via the first conductor 42A to activate the first safety device 82. The second contact 162 may be connected to the first sensor mirror 150. The third contact 164 may be connected to the second conductor 44B of the second track 44, which may be connected to ground.

In embodiments, the second safety device connection portion 74B may include a first contact 170, a second contact 172, and/or a third contact 174 (e.g., high, sense, and low contacts). The first contact 170 may be connected to the first conductor 44A of the second track 44. The third controller 74 may generate and provide the second signal to the second controller 72 (or instruct the second controller 72 to generate the second signal), and the second controller 72 may provide the second signal to the first controller 70 via the first conductor 44A to activate the second safety device 84. The second contact 172 may be connected to the second sensor mirror 152. The third contact 164 may be connected to the second conductor 44B of the second track 44 (e.g., the ground) and/or the third contact 174 of the first safety device connection portion 74A.

With embodiments, the third controller 74 may monitor (e.g., wirelessly or via PLC) the status of the first safety device 82 and/or the second safety device 84 via the first sensor mirror 150 and/or the second sensor mirror 152, respectively. The third controller 74 may be configured to determine the status of the safety devices 80, control the safety devices 80 according to the determined status, and/or activate the safety devices 80 upon sensing a crash via the crash sensors 110.

In embodiments, a controller (e.g., the first controller 70, the second controller 72, and/or the third controller 74) may include an electronic controller and/or include an electronic processor, such as a programmable microprocessor and/or microcontroller. In embodiments, a controller may include, for example, an application specific integrated circuit (ASIC). A controller may include a central processing unit (CPU), a memory (e.g., a non-transitory computer-readable storage medium), and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having both ROM, RAM, a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute one or more processors, multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. An electrical assembly, comprising:
  a support assembly including
    a controller;
    a first safety device; and
    a second safety device;
  a track assembly, including:
    a first track; and
    a second track;
  wherein the support assembly is configured for selective mechanical and electrical connection with the track assembly in a first direction and in a second direction; and the controller is configured to receive a first signal and a second signal from the track assembly and provide the first signal to the first safety device and provide the second signal to the second safety device when the support assembly is connected with the track assembly in the first direction and when the support assembly is connected with the track assembly in the second direction and wherein the support assembly includes a router configured for providing the first signal from a first contact of the support assembly to the first safety device when the support assembly is connected in the first direction, and providing the first signal from a second contact of the support assembly to the first safety device when the support assembly is connected in the second direction.

2. The electrical assembly of claim 1, wherein the first safety device includes an airbag activated by pyrotechnics; and the first safety device is configured to be activated directly by the first signal.

3. The electrical assembly of claim 1, wherein the router is configured to identify signals received via the first contact and the second contact.

4. The electrical assembly of claim 1, wherein the support assembly includes a first portion including the first contact and the second contact; the first contact is configured to contact a first conductor of the first track when the support assembly is connected to the track assembly in the first direction; and the first contact is configured to contact a first conductor of the second track when the support assembly is connected to the track assembly in the second direction.

5. The electrical assembly of claim 4, wherein the support assembly includes a second portion including a first contact and a second contact; the first contact of the second portion is configured to contact the first conductor of the second track when the support assembly is connected to the track assembly in the first direction; and the first contact of the second portion is configured to contact the first conductor of the first track when the support assembly is connected to the track assembly in the second direction.

6. The electrical assembly of claim 5, wherein the second contact of the first portion is configured to contact a second conductor of the first track when the support assembly is connected to the track assembly in the first direction; and the second conductor is connected to a power supply.

7. The electrical assembly of claim 6, wherein the second contact of the second portion is configured to contact a second conductor of the second track when the support assembly is connected to the track assembly in the first direction.

8. The electrical assembly of claim 1, wherein the controller includes the router, and the router is configured to provide the first signal to the first safety device and provide the second signal to the second safety device regardless of whether the support assembly is connected to the track assembly in the first direction or the second direction.

9. The electrical assembly of claim 1, including a first sensor configured to obtain information about a status of the first safety device.

10. The electrical assembly of claim 1, including a second controller having a first sensor mirror; wherein the controller is configured to provide the information about a status of the first safety device obtained via a first sensor to the first sensor mirror via a wireless communication device.

11. The electrical assembly of claim 10, including a third controller connected to the second controller; wherein the third controller is configured to generate the first signal and the second signal.

12. The electrical assembly of claim 11, wherein the third controller includes a secondary power supply and is configured to provide the first signal and the second signal to the second controller even if a primary power supply is disconnected, off, or not functioning.

13. An electrical assembly, comprising:
  a support member including:
    a first controller;
    a first safety device; and
    a second safety device
  a track assembly, including:
    a first track; and
    a second track; and
    a second controller connected to the first track and the second track;
  wherein the support member is configured for connection with the first track and the second track;
  the second controller provides a first signal and a second signal to the first controller via the first track and the second track;
  the first controller is connected to a first sensor; and
  the second controller is connected to a first sensor mirror configured to communicate with the first sensor.

14. The electrical assembly of claim 13, including one or more crash sensors; wherein the track assembly includes a third controller connected to the second controller and the one or more crash sensors;
  the third controller is configured to generate the first signal and the second signal; and
  the third controller is configured to generate the first signal and the second signal according to information from the one or more crash sensors.

15. The electrical assembly of claim 13, wherein the first controller is electrically connected to the first safety device and configured to provide the first signal to the first safety device.

16. The electrical assembly of claim 13, wherein the first controller is connected to a second sensor of the support member; the second controller is connected to a second sensor mirror; and the second sensor is configured to communicate with the second sensor mirror.

17. The electrical assembly of claim 16, wherein the first sensor is configured to obtain information about a status of the first safety device; and the second sensor is configured to obtain information about a status of the second safety device.

18. An electrical assembly, comprising:
a support member including:
   a first controller;
   a first safety device; and
   a second safety device
a track assembly, including:
   a first track; and
   a second track;
   a second controller connected to the first track and the second track; and
   a third controller connected to the second controller and configured to generate a first signal and a second signal;
wherein the support member is configured for connection with the first track and the second track;
the second controller provides the first signal and the second signal from the third controller to the first controller via the first track and the second track; and
the third controller is configured for connection with a first power supply; the third controller includes a second power supply.

19. The electrical assembly of claim 18, wherein the third controller is configured to generate the first signal and the second signal via the second power supply when the first power supply is disconnected or off.

* * * * *